United States Patent
Horimoto et al.

(10) Patent No.: US 11,911,941 B2
(45) Date of Patent: Feb. 27, 2024

(54) SHUT-OFF NOZZLE WITH NEEDLE VALVE, INJECTION DEVICE AND INJECTION MOLDING MACHINE

(71) Applicant: THE JAPAN STEEL WORKS, LTD., Tokyo (JP)

(72) Inventors: Yuya Horimoto, Tokyo (JP); Takafumi Nishibe, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/703,009

(22) Filed: Mar. 24, 2022

(65) Prior Publication Data

US 2022/0305709 A1   Sep. 29, 2022

(30) Foreign Application Priority Data

Mar. 25, 2021   (JP) .................................. 2021-051027

(51) Int. Cl.
| | |
|---|---|
| *B29C 45/28* | (2006.01) |
| *B29C 45/77* | (2006.01) |
| *B29C 45/17* | (2006.01) |
| *B29C 45/23* | (2006.01) |

(52) U.S. Cl.
CPC .......... *B29C 45/281* (2013.01); *B29C 45/176* (2013.01); *B29C 45/23* (2013.01); *B29C 45/77* (2013.01)

(58) Field of Classification Search
CPC ............................. B29C 45/176; B29C 45/23
See application file for complete search history.

(56) References Cited

U.S. PATENT DOCUMENTS

2002/0092929 A1*   7/2002   Arimoto ............ F02M 61/1873
239/533.3

FOREIGN PATENT DOCUMENTS

| CN | 109249586 A | * | 1/2019 | |
|---|---|---|---|---|
| CN | 209971455 U | * | 1/2020 | |
| JP | 2002292683 A | * | 10/2002 | ........... B29C 45/231 |
| JP | 2002-370256 A | | 12/2002 | |
| KR | 2016124433 A | * | 10/2016 | ............. B29C 45/20 |

* cited by examiner

*Primary Examiner* — Alison L Hindenlang
*Assistant Examiner* — Virak Nguon
(74) *Attorney, Agent, or Firm* — Sughrue Mion, PLLC (57) ABSTRACT

A shut-off nozzle includes: an injection nozzle in which a flow path is formed; a needle valve provided in the flow path coaxially with the injection nozzle, the needle valve being movable forward and backward in an axial direction; and a guide ring provided in the flow path. The needle valve includes a columnar shaft portion, and the guide ring is configured to guide the forward and backward movement of the needle valve at the shaft portion. An injection device includes: a heating cylinder; a screw provided in the heating cylinder; and the shut-off nozzle provided in the heating cylinder. An injection molding machine includes: a mold clamping device configured to clamp a mold; and the injection device configured to inject a resin.

14 Claims, 6 Drawing Sheets

SHUT-OFF NOZZLE WITH NEEDLE VALVE, INJECTION DEVICE AND INJECTION MOLDING MACHINE

CROSS-REFERENCE TO RELATED APPLICATIONS

This application is based on and claims priority under 35 USC 119 from Japanese Patent Application No. 2021-051027 filed on Mar. 25, 2021, the contents of which are incorporated herein by reference.

TECHNICAL FIELD

The present disclosure relates to a shut-off nozzle in which a needle valve provided coaxially with an injection nozzle in a flow path of the injection nozzle moves forward and backward to open and close an injection port, an injection device including such a shut-off nozzle, and an injection molding machine.

BACKGROUND

As a shut-off nozzle provided in an injection device, a shut-off nozzle provided with a needle valve is well known. In such a shut-off nozzle, the needle valve may be driven obliquely with respect to an injection nozzle, or may be driven coaxially with respect to the injection nozzle. The latter type of shut-off nozzle is configured as follows. In the injection nozzle, a flow path through which an injection material flows is provided coaxially with the injection nozzle. The needle valve is provided in the flow path. That is, the needle valve is provided coaxially with the injection nozzle. The needle valve is configured to move forward and backward by a predetermined drive mechanism provided at a rear end portion of the needle valve. When the needle valve is driven forward, a tip end of the injection nozzle is closed by a tip end of the needle valve.

However, depending on the injection device, it is necessary to adopt a shut-off nozzle with a long injection nozzle, and in this case, the needle valve is inevitably long. In this case, the needle valve is easily bent by its own weight, and it is difficult to accurately open and close an injection port when the needle valve is driven.

JP-A-2002-370256 (PTL 1) proposes a shut-off nozzle that solves a problem of bending of a needle valve. In the shut-off nozzle described in PTL 1, a guide mechanism is provided in a vicinity of the injection port of the injection nozzle. Specifically, a plurality of protrusions, that is, support blades are formed from an inner peripheral surface of the flow path toward a center in the vicinity of the injection port of the injection nozzle. A tip end portion of the needle valve is guided by a plurality of support blades so that the needle valve moves forward and backward.

SUMMARY

In the shut-off nozzle described in PTL 1, since the needle valve is guided at the tip end portion thereof, bending is prevented, and the injection port is accurately opened and closed by the needle valve. However, in order to form the support blade, it is necessary to machine the flow path of the injection material into a complicated shape. That is, there is a problem that manufacturing cost of the injection nozzle is high and the shut-off nozzle is expensive.

The present disclosure provides a shut-off nozzle capable of preventing bending of a needle valve while preventing an increase in cost required for machining, an injection device including such a shut-off nozzle, and an injection molding machine.

Other problems and novel features will become apparent from the description of this specification and the accompanying drawings.

For a shut-off nozzle in which a needle valve is provided coaxially with an injection nozzle in a flow path of the injection nozzle, a guide ring is provided in the flow path of the injection nozzle. The needle valve includes a columnar shaft portion. The guide ring is configured to guide forward and backward movement of the needle valve at the shaft portion.

According to the present disclosure, it is possible to prevent bending of the needle valve while preventing an increase in cost required for machining of the shut-off nozzle.

DETAILED DESCRIPTION

Hereinafter, illustrative embodiments will be described in detail with reference to the drawings. However, the present invention is not limited to the following illustrative embodiments. In order to clarify the description, the following description and the drawings are simplified as appropriate. In all the drawings, the same elements are denoted by the same reference numerals, and repetitive descriptions thereof will be omitted. In addition, there is a portion where hatching is omitted such that the drawing is not complicated.

The present illustrative embodiment will be described.

Injection Molding Machine

Figure 1:
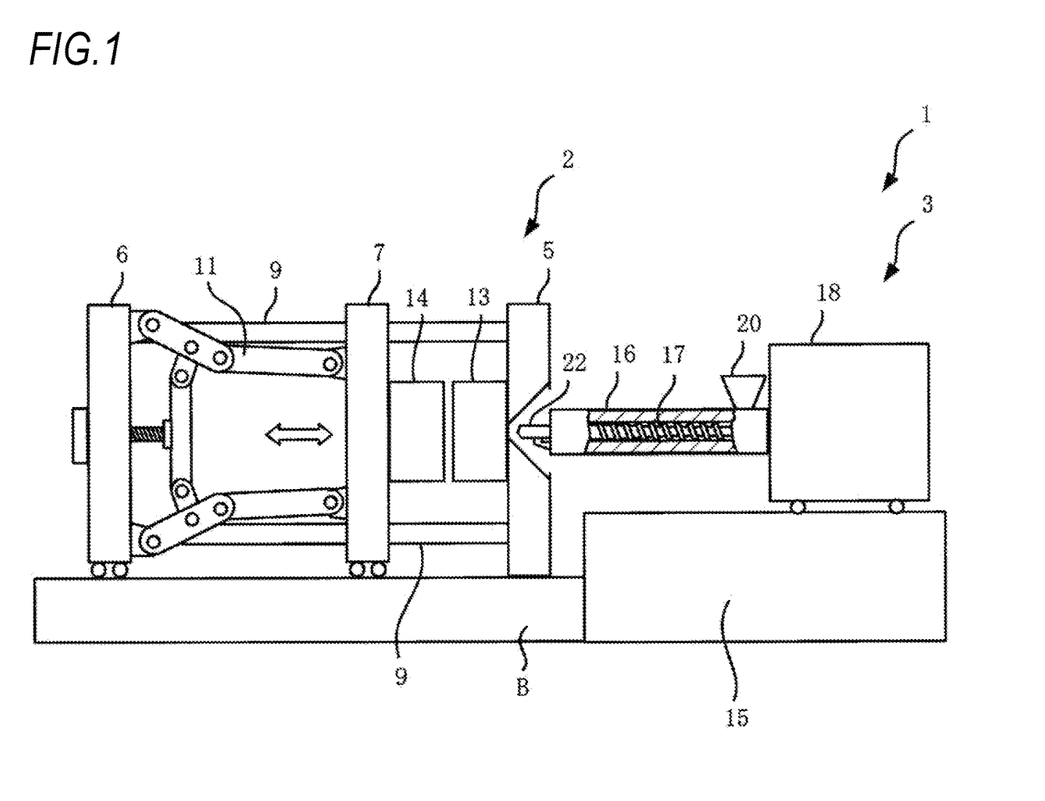
FIG. 1 is a front view showing an injection molding machine according to an illustrative embodiment of the present invention.

The injection molding machine 1 according to the present illustrative embodiment is configured as shown in FIG. 1. That is, the injection molding machine 1 roughly includes a mold clamping device 2 for clamping a mold and an injection device 3 for melting and injecting an injection material.

Mold Clamping Device

In the present illustrative embodiment, the mold clamping device 2 includes a fixed platen 5 fixed on a bed B, a mold clamping housing 6 that slides on the bed B, and a movable platen 7 that slides on the bed B in the same manner. The fixed platen 5 and the mold clamping housing 6 are connected by a plurality of, for example, four tie bars 9. The movable platen 7 is slidable between the fixed platen 5 and the mold clamping housing 6. A mold clamping mechanism 11 is provided between the mold clamping housing 6 and the movable platen 7. The mold clamping mechanism 11 may be a direct pressure type mold clamping mechanism, that is, a mold clamping cylinder. However, in the present illustrative embodiment, the mold clamping mechanism 11 is configured by a toggle mechanism. The fixed platen 5 and the movable platen 7 are respectively provided with molds 13 and 14, and when the mold clamping mechanism 11 is driven, the molds 13 and 14 are opened and closed.

Injection Device

The injection device 3 is provided on a base 15, and includes a heating cylinder 16, a screw 17 housed in the heating cylinder 16, and a screw drive device 18 for driving the screw 17. A hopper 20 is provided in a vicinity of a rear end portion of the heating cylinder 16, and an injection material is supplied to the heating cylinder 16. A shut-off nozzle 22 according to the present illustrative embodiment described below is provided at a tip end of the heating cylinder 16.

Shut-Off Nozzle

Figure 2:
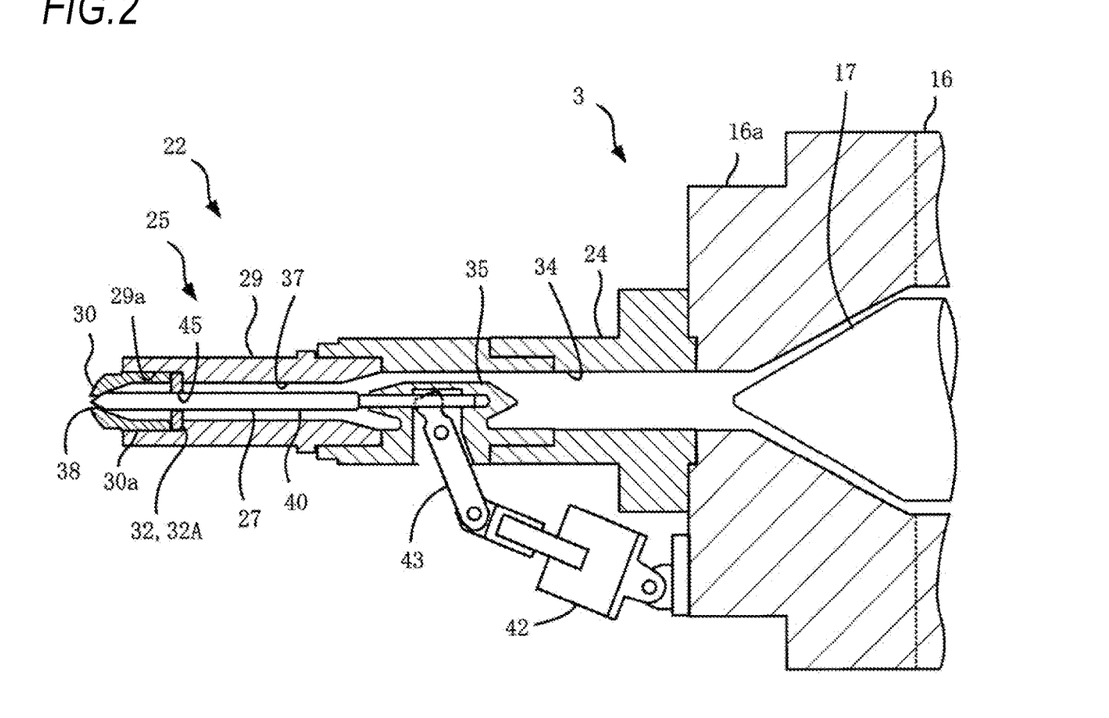
FIG. 2 is a front sectional view showing a shut-off nozzle and a part of an injection device according to the illustrative embodiment.

As shown in FIG. 2, the shut-off nozzle 22 according to the present illustrative embodiment is provided at the heating cylinder 16. More specifically, an adapter 16a is provided at the tip end of the heating cylinder 16, and the shut-off nozzle 22 is provided in the adapter 16a. The shut-off nozzle 22 includes a nozzle base 24 provided in the adapter 16a, an injection nozzle 25 provided at a tip end of the nozzle base 24, and a needle valve 27 provided in the injection nozzle 25.

The injection nozzle 25 includes a nozzle adapter 29 provided in the nozzle base 24, and a nozzle tip 30 provided at a tip end of the nozzle adapter 29. In the present illustrative embodiment, the nozzle adapter 29 is formed with a mounting hole 29a in an axial direction at a tip end portion thereof, and a female screw is formed. On the other hand, a male screw is formed on an outer peripheral surface 30a of the nozzle tip 30, and the nozzle tip 30 is screwed into the mounting hole 29a. A guide ring 32 according to the present illustrative embodiment, which will be described in detail later, is provided in the mounting hole 29a of the nozzle adapter 29, and the guide ring 32 is fastened by the nozzle tip 30. That is, the guide ring 32 is sandwiched between the nozzle adapter 29 and the nozzle tip 30.

A flow path through which the injection material flows is configured as follows. First, a flow path 34 in a nozzle base communicating with a bore of the heating cylinder 16 is formed in the nozzle base 24. A support portion 35 that supports the needle valve 27 is formed in a downstream portion of the nozzle base 24. The support portion 35 has a so-called torpedo shape, and is formed in a downstream portion of the flow path 34 in a nozzle base. Therefore, the flow path 34 in a nozzle base is formed so as to surround an outer peripheral surface of the support portion 35 in a vicinity of the support portion 35.

In the injection nozzle 25, a flow path communicating with the flow path 34 in a nozzle base, that is, a flow path 37 in an injection nozzle is formed. The flow path 37 in an injection nozzle is formed to have the same diameter in the nozzle adapter 29 and the nozzle tip 30, but the flow path 37 in an injection nozzle is reduced in a diameter at a tip end of the nozzle tip 30 to form an injection port 38.

The needle valve 27 is provided coaxially with the injection nozzle 25 in the flow path 37 in an injection nozzle, and a rear end portion of the needle valve 27 is provided in the support portion 35. The needle valve 27 is provided with a columnar shaft portion 40, and the needle valve 27 is supported by the guide ring 32 at the shaft portion 40.

The shut-off nozzle 22 according to the present illustrative embodiment is provided with a piston cylinder unit 42 and a lever mechanism 43 as a drive mechanism for driving the needle valve 27. A rear end portion of the needle valve 27 is connected to the lever mechanism 43. When the piston cylinder unit 42 is driven, the lever mechanism 43 rotates, and the needle valve 27 moves forward and backward.

Guide Ring

A guide ring 32A according to a first illustrative embodiment will be described. As shown in a front view of FIG. 3, the guide ring 32A is made of a disk-shaped metal plate. The thickness of the guide ring 32A is preferably about 8 mm to about 12 mm, and more preferably, about 10 mm. A guide hole 45 into which the needle valve 27 (see FIG. 2) is inserted is formed in an axial center of the guide ring 32A. A diameter of the guide hole 45 is slightly larger than an outer diameter of the shaft portion 40 of the needle valve 27. Therefore, the needle valve 27 is smoothly slid with respect to the guide hole 45 in the shaft portion 40.

Figure 3:
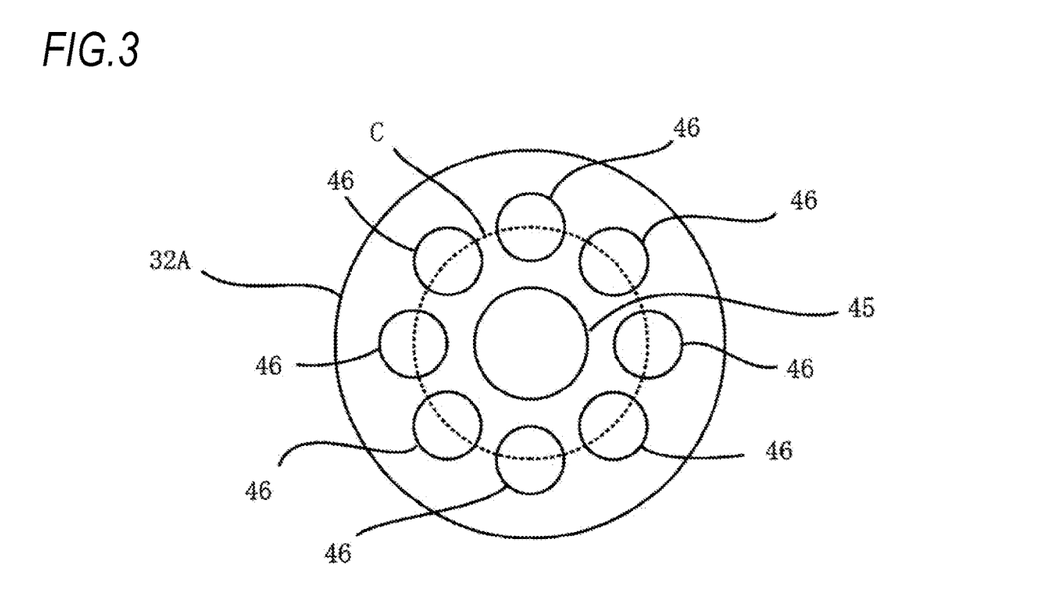
FIG. 3 is a front view showing a guide ring according to a first illustrative embodiment.

A plurality of holes 46 are formed in the guide ring 32A around the guide hole 45. Each of the holes 46 has a circular shape. The plurality of holes 46 are arranged at equal intervals on a virtual circle C centered on an axial center of the guide ring 32A. The plurality of holes 46 are used for flowing the injection material. The plurality of holes 46 are preferably arranged at equal intervals on the virtual circle C, but may not necessarily be arranged at equal intervals.

The guide ring 32A according to the present illustrative embodiment can be manufactured by simply forming the guide hole 45 and the plurality of holes 46 in the disk-shaped metal plate in this way. That is, it can be manufactured by drilling the metal plate. Therefore, there is a feature that an increase in manufacturing cost can be prevented.

Figure 4:
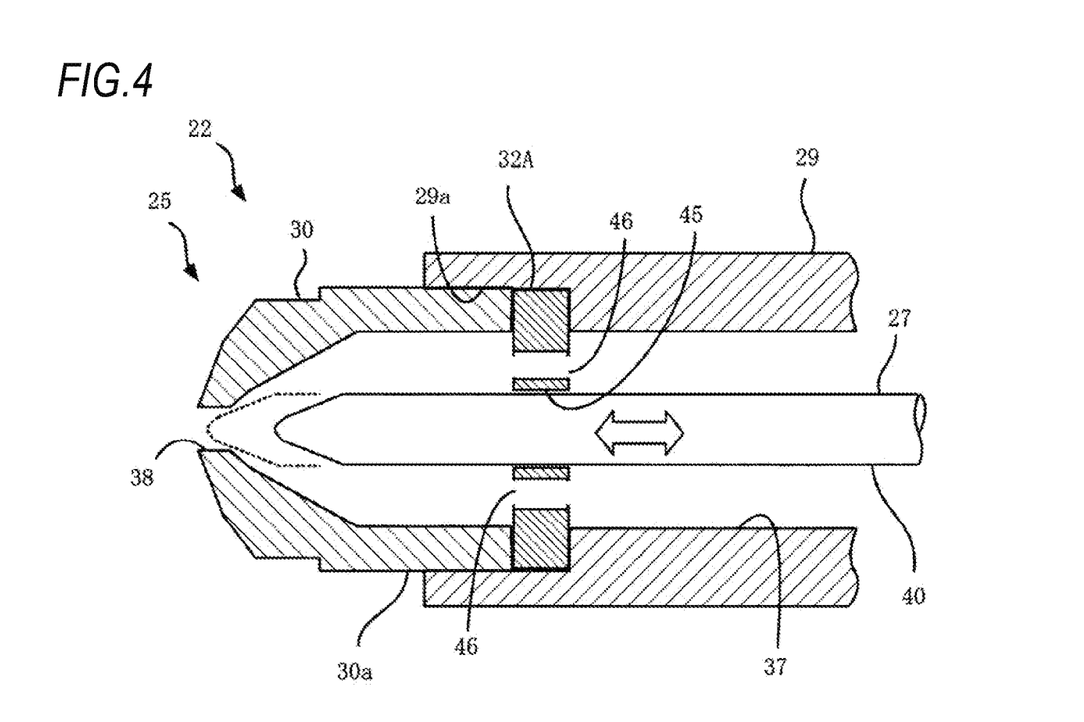
FIG. 4 is a front sectional view showing a part of a shut-off nozzle with the guide ring according to the first illustrative embodiment of the present invention.

FIG. 4 shows a part of the shut-off nozzle 22 provided with the guide ring 32A according to the first illustrative embodiment. The shaft portion 40 of the needle valve 27 is inserted into the guide hole 45 of the guide ring 32A. When the needle valve 27 is moved forward and backward, the shaft portion 40 of the needle valve 27 is guided by the guide ring 32A. Therefore, even when the length of the needle valve 27 is long, the needle valve 27 is not easily bent. Since the needle valve 27 is not easily bent, the injection port 38 can be accurately opened and closed by a tip end portion of the needle valve 27.

Shut-Off Nozzle of the Related Art

Figure 5:
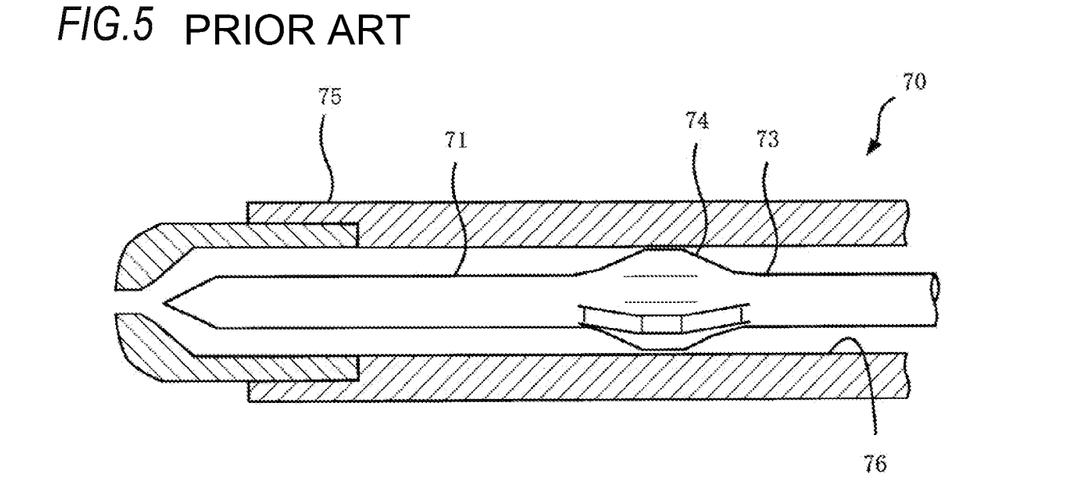
FIG. 5 is a front sectional view showing a part of a shut-off nozzle of the related art.

This is compared with a shut-off nozzle of the related art. FIG. 5 shows a part of a shut-off nozzle 70 of the related art. In the shut-off nozzle 70, a needle valve 71 is processed into a special shape. That is, a blade portion 74 is formed at a predetermined position of a shaft portion 73 of the needle valve 71. The blade portion 74 smoothly slides with respect to a flow path 76 of an injection nozzle 75. Therefore, even if the needle valve 71 is long, the needle valve 71 moves forward and backward without being bent. However, in order to provide the blade portion 74 in the needle valve 71, complicated processing is required, and the manufacturing cost is high. The guide ring 32A (see FIG. 3) according to the present illustrative embodiment can be manufactured at low cost as described above, and therefore, it is excellent.

Guide Ring According to Second Illustrative Embodiment

Figure 6A:
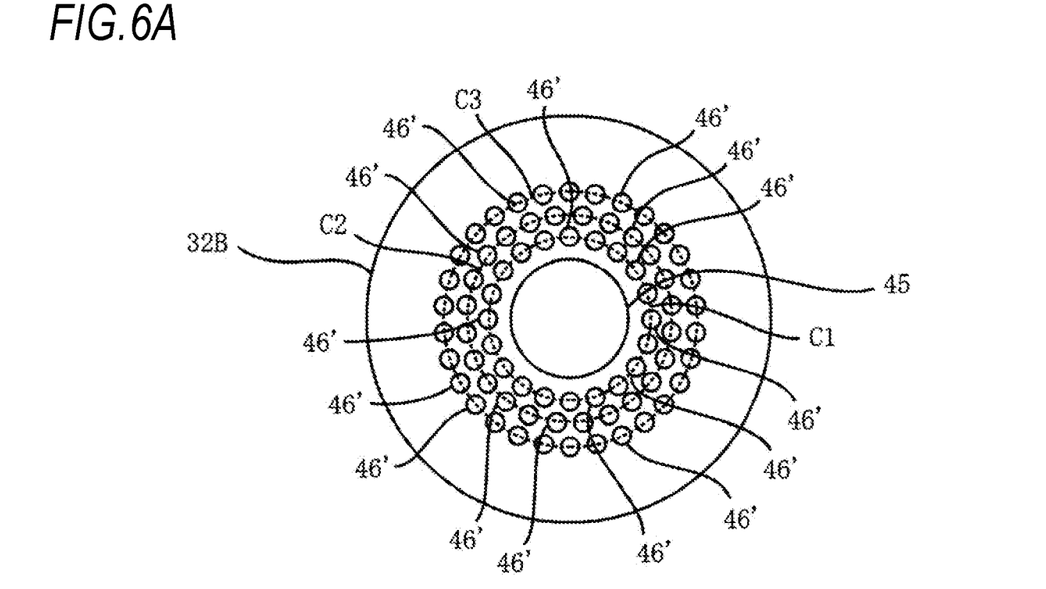
FIG. 6A is a front view showing a guide ring according to a second illustrative embodiment of the present invention.

The guide ring 32 can be variously modified. FIG. 6A shows a guide ring 32B according to a second illustrative embodiment. A plurality of small-diameter holes 46' are formed in the guide ring 32B. The plurality of small-diameter holes 46' are arranged at equal intervals on three virtual circles C1, C2, and C3 having different diameters centered on an axial center of the guide ring 32B. That is, a part of the plurality of holes 46' are evenly arranged in an circumferential direction on the virtual circle C1 having a minimum diameter in a vicinity of the guide hole 45, another part of the plurality of holes 46' are evenly arranged in the circumferential direction on the virtual circle C2 having a larger diameter than the virtual circle C1, and the rest of the plurality of holes 46' are evenly arranged in the circumferential direction on the virtual circle C3 having a maximum diameter. The plurality of small-diameter holes 46 are used for flowing the injection material, and have a filter function for preventing a solid injection material from flowing out.

The plurality of small-diameter holes 46' are preferably arranged at equal intervals on the three virtual circles C1, C2, and C3, but may not necessarily be arranged at equal intervals. In addition, in this illustrative embodiment, the plurality of small-diameter holes 46' are arranged on three virtual circles C1, C2, and C3 having different diameters, but may be arranged on two virtual circles or four or more virtual circles.

Guide Ring According to Third Illustrative Embodiment

Figure 6B:
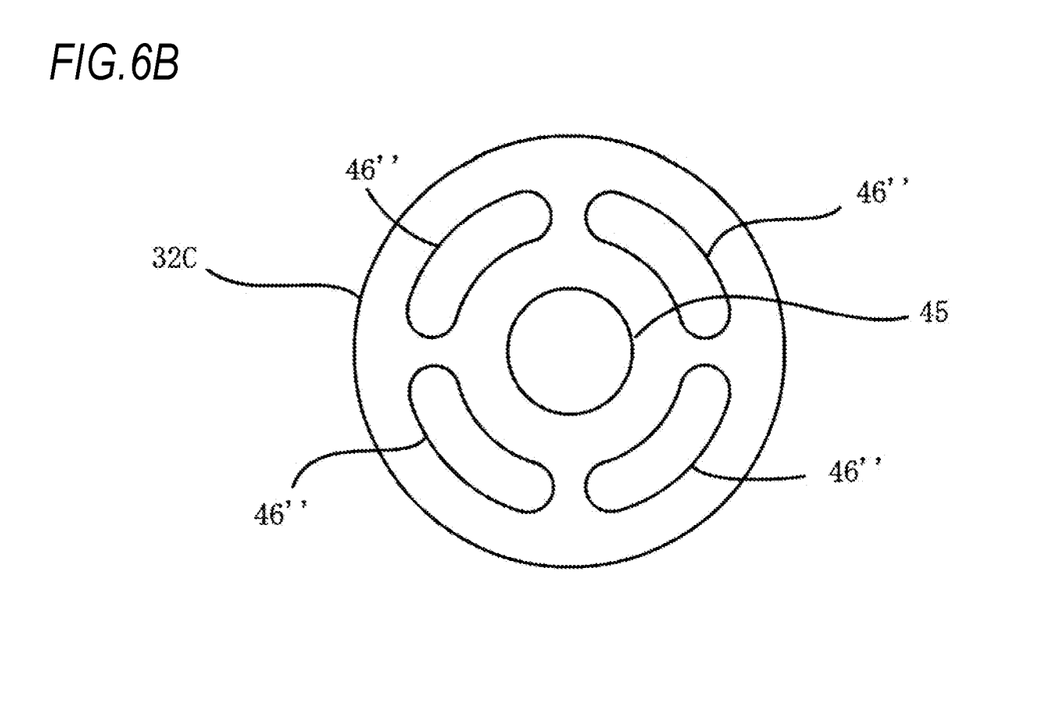
FIG. 6B is a front view showing a guide ring according to a third illustrative embodiment of the present invention.

FIG. 6B shows a guide ring 32C according to a third illustrative embodiment. A shape of each of holes 46" formed in the guide ring 32C according to the third illustrative embodiment is a curved elongated hole shape in an axial sectional view, and four corners thereof are rounded. The number of the holes 46" is not limited to four.

Guide Ring According to Fourth Illustrative Embodiment

Figure 6C:
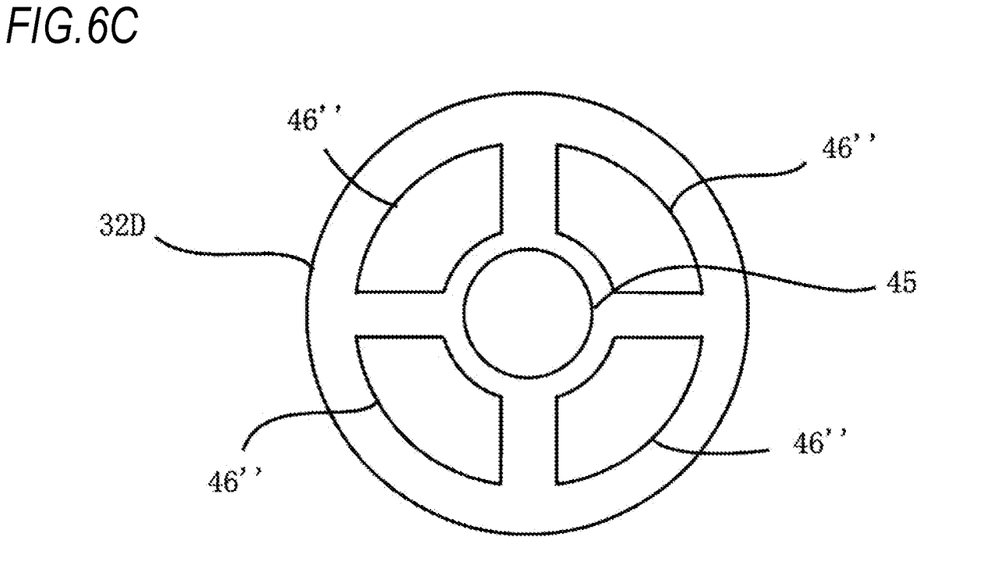
FIG. 6C is a front view showing a guide ring according to a fourth illustrative embodiment of the present invention.

FIG. 6C shows a guide ring 32D according to a fourth illustrative embodiment. Each of the holes 46'" formed in the guide ring 32D according to the fourth illustrative embodiment has a shape obtained by dividing a doughnut shape into a predetermined number in the axial sectional view. In FIG. 6C, the number of divisions of the doughnut shape in the holes 46'" is four, but the number of divisions is not limited to four.

Guide Ring According to Fifth Illustrative Embodiment

Figure 6D:
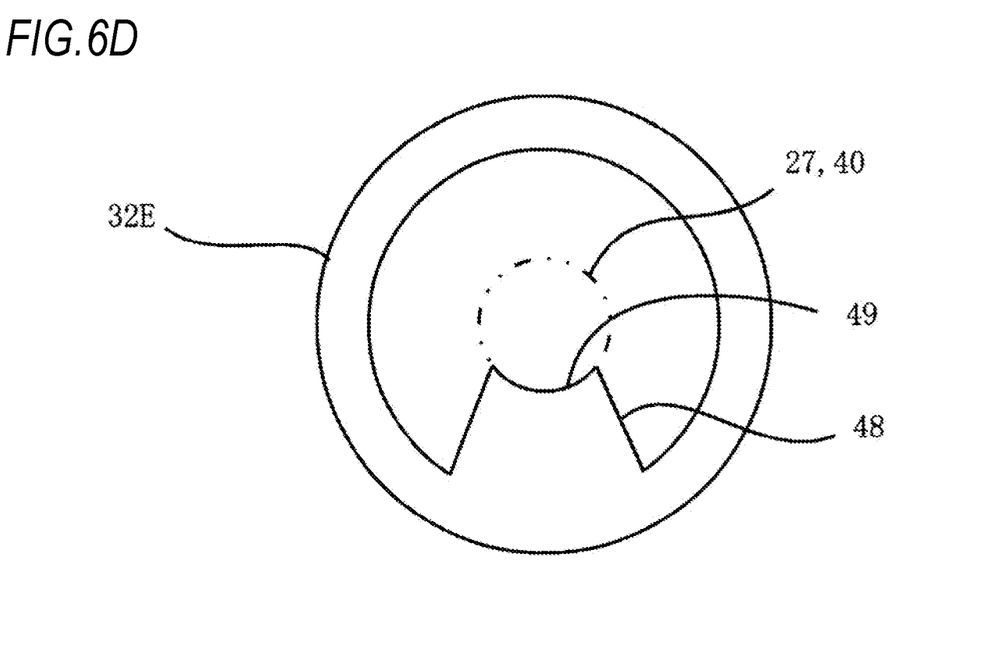
FIG. 6D is a front view showing a guide ring according to a fifth illustrative embodiment of the present invention.

FIG. 6D shows a guide ring 32E according to a fifth illustrative embodiment. In the guide ring 32E according to this illustrative embodiment, a guide portion 48 protrudes from a part of an inner peripheral surface of a ring-shaped portion toward a center in a radial direction. The guide portion 48 has a substantially triangular shape in a sectional view perpendicular to an axial direction, and a distal end portion 49 thereof is formed in an arc shape. The needle valve 27 indicated by a two-dot chain line in FIG. 6D is supported by the distal end portion 49, and is smoothly guided without being bent. In this illustrative embodiment, since an area of a hollow portion is large, the injection material flows smoothly.

Shut-Off Nozzle According to Another Illustrative Embodiment

In the plurality of illustrative embodiments described above, the guide rings 32A, 32B, 32C, 32D, and 32E are fixed to the injection nozzle 25 (see FIGS. 2 and 4), and the needle valve 27 slides with respect to the guide rings 32A, 32B, 32C, 32D, and 32E at the shaft portion 40 thereof.

Figure 7:
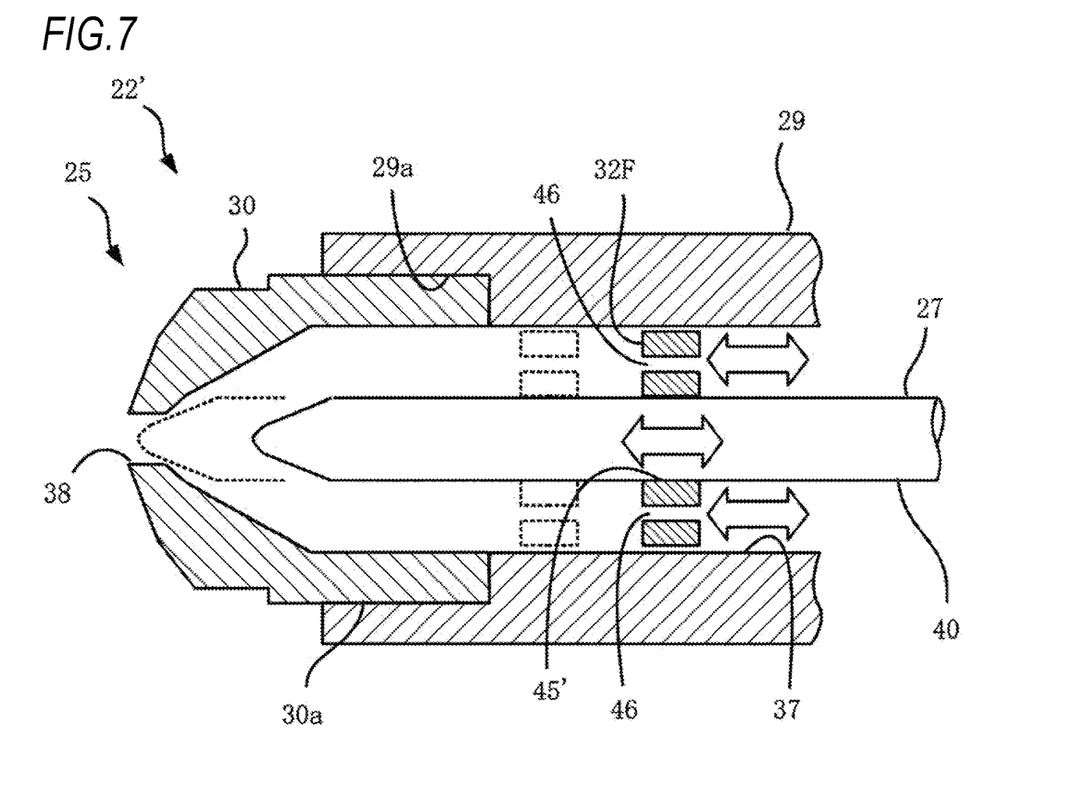
FIG. 7 is a front sectional view showing a part of a shut-off nozzle according to a different illustrative embodiment of the present invention.

FIG. 7 shows a shut-off nozzle 22' different from these illustrative embodiments. That is, in this illustrative embodiment, in a guide ring 32F, a diameter of the guide hole 45' is equal to or slightly smaller than the diameter of the shaft portion 40 of the needle valve 27. Further, the guide ring 32E is fixedly fitted to the shaft portion 40 of the needle valve 27. Therefore, when the needle valve 27 is moved forward and backward, the guide ring 32F is also moved forward and backward integrally with the needle valve 27, and the guide ring 32F slides with respect to the flow path 37 in an injection nozzle of the injection nozzle 25. That is, the guide ring 32F is fixed to the shaft portion 40 of the needle valve 27 and is configured to move forward and backward integrally with the needle valve 27 when the needle valve 27 moves forward and backward, with an outer peripheral portion of the guide ring 32F sliding with respect to a bore of the flow path 37 in the injection nozzle. The shut-off nozzle 22' according to this illustrative embodiment also prevents the needle valve 27 from being bent.

Although the invention made by the present inventors has been specifically described based on the illustrative embodiments, the present disclosure is not limited to the illustrative embodiments described above, and it is needless to say that various modifications can be made without departing from the scope of the present disclosure. The plurality of examples described above can be implemented in combination as appropriate.

What is claimed is:
1. A shut-off nozzle comprising:
    an injection nozzle in which a flow path is formed;
    a needle valve provided in the flow path coaxially with the injection nozzle, the needle valve being movable forward and backward in an axial direction; and
    a guide ring provided in the flow path,
wherein the needle valve comprises a columnar shaft portion, and the guide ring is configured to guide the forward and backward movement of the needle valve at the shaft portion, and
    wherein the guide ring is fixed to the shaft portion of the needle valve and is configured to move forward and backward integrally with the needle valve when the needle valve moves forward and backward, with an outer peripheral portion of the guide ring sliding with respect to a bore of the flow path.
2. The shut-off nozzle according to claim 1,
    wherein the injection nozzle comprises:
        a nozzle adapter; and a nozzle tip provided at a tip end of the nozzle adapter, and wherein the guide ring is nipped between the nozzle adapter and the nozzle tip.

3. The shut-off nozzle according to claim 2, wherein the nozzle tip has a first portion and a second portion, and a diameter of the first portion of the nozzle tip is the same as a diameter of the nozzle adapter.

4. The shut-off nozzle according to claim 2, wherein the nozzle adapter is formed with a mounting hole in an axial direction at the tip end portion of the nozzle adapter, and a female screw is formed in the mounting hole, and wherein a male screw is formed on an outer peripheral surface of the nozzle tip, and the nozzle tip is screwed into the mounting hole.

5. The shut-off nozzle according to claim 1, wherein the guide ring has a plurality of holes through which an injection material passes.

6. The shut-off nozzle according to claim 5, wherein centers of the plurality of holes are arranged on a circumference of any one of a plurality of virtual circles having different diameters centered on an axial center of the guide ring.

7. An injection device comprising:

a heating cylinder;

a screw provided in the heating cylinder; and a shut-off nozzle provided in the heating cylinder, the shut-off nozzle comprising:

an injection nozzle in which a flow path is formed;

a needle valve provided in the flow path coaxially with the injection nozzle, the needle valve being movable forward and backward in an axial direction; and a guide ring provided in the flow path, wherein the needle valve comprises a columnar shaft portion, and the guide ring is configured to guide the forward and backward movement of the needle valve at the shaft portion, and wherein the guide ring is fixed to the shaft portion of the needle valve and is configured to move forward and backward integrally with the needle valve when the needle valve moves forward and backward, with an outer peripheral portion of the guide ring sliding with respect to a bore of the flow path.

8. The injection device according to claim 7, wherein the injection nozzle comprises:

a nozzle adapter; and a nozzle tip provided at a tip end of the nozzle adapter, and wherein the guide ring is nipped between the nozzle adapter and the nozzle tip.

9. The injection device according to claim 7, wherein the guide ring has a plurality of holes through which an injection material passes.

10. The injection device according to claim 9, wherein centers of the plurality of holes are arranged on a circumference of any one of a plurality of virtual circles having different diameters centered on an axial center of the guide ring.

11. An injection molding machine comprising:

a mold clamping device configured to clamp a mold; and an injection device configured to inject a resin, the injection device comprising:

a heating cylinder;

a screw provided in the heating cylinder; and a shut-off nozzle provided in the heating cylinder, the shut-off nozzle comprising:

an injection nozzle in which a flow path is formed;

a needle valve provided in the flow path coaxially with the injection nozzle, the needle valve being movable forward and backward in an axial direction; and a guide ring provided in the flow path, wherein the needle valve comprises a columnar shaft portion, and the guide ring is configured to guide the forward and backward movement of the needle valve at the shaft portion, and wherein the guide ring is fixed to the shaft portion of the needle valve and is configured to move forward and backward integrally with the needle valve when the needle valve moves forward and backward, with an outer peripheral portion of the guide ring sliding with respect to a bore of the flow path.

12. The injection molding machine according to claim 11, wherein the injection nozzle comprises:

a nozzle adapter; and a nozzle tip provided at a tip end of the nozzle adapter, and wherein the guide ring is nipped between the nozzle adapter and the nozzle tip.

13. The injection molding machine according to claim 11, wherein the guide ring has a plurality of holes through which an injection material passes.

14. The injection molding machine according to claim 13, wherein centers of the plurality of holes are arranged on a circumference of any one of a plurality of virtual circles having different diameters centered on an axial center of the guide ring.

* * * * *